(12) United States Patent
Terasaka

(10) Patent No.: US 7,448,700 B2
(45) Date of Patent: Nov. 11, 2008

(54) ANTI-LOCK BRAKE CONTROL DEVICE AND BRAKE CONTROL DEVICE

(75) Inventor: Masato Terasaka, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 141 days.

(21) Appl. No.: 11/110,911

(22) Filed: Apr. 21, 2005

(65) Prior Publication Data
US 2005/0236891 A1 Oct. 27, 2005

(30) Foreign Application Priority Data
Apr. 23, 2004 (JP) ............................. 2004-128589

(51) Int. Cl.
*B60T 8/66* (2006.01)
(52) U.S. Cl. ....................... 303/164; 303/170; 303/149; 303/150
(58) Field of Classification Search .................. 303/170, 303/149, 150, 164
See application file for complete search history.

(56) References Cited

U.S. PATENT DOCUMENTS

| | | | | |
|---|---|---|---|---|
| 4,005,910 A | * | 2/1977 | Leiber et al. ................ | 303/146 |
| 5,058,018 A | * | 10/1991 | Kuwana et al. ................ | 701/73 |
| 5,271,666 A | * | 12/1993 | Okubo ........................ | 303/149 |
| 5,452,947 A | * | 9/1995 | Ehmer et al. ................. | 303/150 |
| 5,788,342 A | * | 8/1998 | Noguchi .................... | 303/116.2 |
| 6,318,820 B1 | * | 11/2001 | Usukura ..................... | 303/149 |

FOREIGN PATENT DOCUMENTS

| | | |
|---|---|---|
| JP | 01-269655 | 10/1989 |
| JP | 08-099622 | 4/1996 |
| JP | 2002-104153 | 4/2002 |

* cited by examiner

*Primary Examiner*—Robert A. Siconolfi
*Assistant Examiner*—Vu Q Nguyen
(74) *Attorney, Agent, or Firm*—Buchanan Ingersoll & Rooney PC

(57) ABSTRACT

In controlling a vehicle, an ECU (anti-lock brake control device) of a brake control device judges a difference in relative length between lock-to-lock time intervals of left and right wheels (step 302), calculates cumulative compensation amounts in dependence on the judged difference (steps 306, 310 to 316), then calculates pressure increase amounts which are brake fluid pressures to be applied respectively to wheel cylinders for the left and right wheels in a pressure increasing mode, in dependence on the cumulative compensation amounts and a base pressure increase amount, and then controls the brake fluid pressures in the pressure increasing mode so that the brake fluid pressures coincide with those so calculated.

7 Claims, 8 Drawing Sheets

ANTI-LOCK BRAKE CONTROL DEVICE AND BRAKE CONTROL DEVICE

This application claims priority under 35 U.S.C. 119 with respect to Japanese Applications No. 2004-128589 filed on Apr. 23, 2004.

BACKGROUND OF THE INVENTION

1. Field of the Invention

The present invention relates to an anti-lock brake control device and a brake control device which are capable of performing a selection-low control.

2. Discussion of the Related Art

Heretofore, as one type of anti-lock brake control devices in this kind, there has been known one which is provided with wheel rotational speed detection means for detecting respective rotational speeds of left and right wheels in the same system and fluid pressure regulating means for independently regulating brake fluid pressures in wheel cylinders which respectively restrict rotations of the left and right wheels. During braking of the vehicle, the fluid pressure regulating means is controlled in any of a pressure increasing mode, a pressure reducing mode and a pressure retention mode in dependence on the rotational speeds of the wheels, and the left and right wheels in the same system are placed under a selection-low control so that the vehicle stability can be secured (refer to Patent Document 1).

As another type, there has also been known one in which front and rear wheels are placed under the selection-low control (refer to Patent Document 2). Specifically, in an anti-lock brake control device described in Patent Document 2, brake fluid pressures for front left and right wheels are controlled independently, and brake fluid pressures for rear left and right wheels are controlled coordinately. With respect to the front wheels, the rear wheels are controlled under the selection-low control in ordinary traveling, but in traveling on a split road with brake being applied, the rear wheels are controlled under a selection-high control and a control threshold value for use in controlling the brake fluid pressures for the rear wheels is compensated to lessen the lock of the rear wheels (S44). The anti-lock brake control device is enabled to be modified so that compensation is likewise made also to lessen the lock during turn traveling on a split road or during turn traveling. The anti-lock brake control device is further enabled to be modified so that the rear wheels are always controlled under the selection-low control and so that the control threshold valve for use in controlling the brake fluid pressures for the rear wheels can be compensated to make the lock stronger in traveling on a split road or in making a turn.

[Patent Document 1] Japanese unexamined, published patent application No. 01-269655 (pp. 3-6 and 11, FIG. 3)

[Patent Document 2] Japanese unexamined, published patent application No. 08-099622 (pp. 5-94, FIGS. 7 and 14)

In the last mentioned anti-lock brake control device, a problem arises in that a sufficient vehicle braking performance cannot be secured due to a difference between braking effects on the left and right wheels. That is, where because of the difference, the selection-low control is performed on the left and right wheels in the same system during braking the vehicle which is traveling on an even road surface, an anti-lock brake control is performed on one wheel which is stronger in the braking effect thereon, and the other wheel which is weaker in the braking effect thereon cannot exercise a sufficient braking performance thereof.

Further, where the left and right wheels have a difference between braking effects thereon, another problem also arises in that the vehicle stability is deteriorated though the vehicle braking performance can be secured sufficiently. That is, when the selection-low control is performed on the left and right wheels in the same system during braking the vehicle traveling on a split road surface in which case one wheel stronger in the braking effect thereon is on a higher-$\mu$ side (i.e., on a side with a higher friction coefficient), an anti-lock brake control is performed for the other wheel at the opposite side, so that the wheel stronger in the braking effect thereon would exercise a more braking performance than as needed.

SUMMARY OF THE INVENTION

Accordingly, it is a primary object of the present invention to provide an improved anti-lock brake control device which is of the type that a selection-low control is performed and which is capable of securing a sufficient vehicle braking performance as well as keeping the vehicle stability although left and right wheels in the same system have a difference between the braking effects thereon.

Briefly, in a first aspect of the present invention, there is provided an anti-lock brake control device in a vehicle having wheel rotational speed sensor means for detecting respective rotational speeds of left and right wheels in the same system; and brake means for adjusting respective rotations of the left and right wheels wherein during braking of the vehicle, the brake means is controlled in any of a pressure increasing mode, a pressure reducing mode and a pressure retention mode in dependence on the rotational speeds of the wheels and wherein during braking of the vehicle, the left and right wheels in the same system are placed under a selection-low control. The anti-lock brake control device comprises lock interval judgment means for judging a difference in relative length between lock-to-lock time intervals of the left and right wheels during braking of the vehicle; and pressure increase amount calculation means for calculating respective pressure increase amounts for the left and right wheels to be applied to the brake means, in dependence on the difference judged by the lock interval judgment means. The anti-lock brake control device controls the brake means during braking of the vehicle so that the pressure increase amounts coincide respectively with those calculated by the pressure increase amount calculation means.

With the construction in the first aspect of the present invention, the lock interval judgment means judges the difference in the relative length between lock-to-lock time intervals of the left and right wheels during braking of the vehicle, pressure increase amount calculation means calculates respective pressure increase amounts which are brake fluid pressures to the respective wheel cylinders for the left and right wheels in the pressure increasing mode, in dependence on the difference judged by the lock interval judgment means, and the anti-lock brake control device controls the brake means in the pressure increasing mode so that the pressure increase amounts coincide respectively with those calculated by the pressure increase amount calculation means. Thus, even where, because of a difference between braking effects on the left and right wheels in the same system, the selection-low control is performed on the left and right wheels in the same system in braking the vehicle which is traveling on an even road surface, the brake fluid pressures supplied to the wheel cylinders for the left and right wheels are controlled to coincide with the pressure increase amounts which are calculated in dependence on the difference in the relative length between the lock-to-lock time intervals. Accordingly, the difference between the braking effects is compensated to balance the braking performances exercised by the left and right wheels, and thus, it can be realized to secure a sufficient vehicle braking performance as well as to enhance the stability of the vehicle.

In another or second aspect of the present invention, there is provided a brake control device which comprises plural wheel speed sensors for respectively detecting rotational speeds of left and right wheels in the same system; plural wheel cylinders for respectively restricting rotations of the left and right wheels; and lock interval judgment means for judging a difference in relative length between lock-to-lock time intervals of the left and right wheels during braking of the vehicle. The brake control device further comprises pressure increase amount calculation means for calculating respective pressure increase amounts for the left and right wheels in dependence on the difference judged by the lock interval judgment means; and fluid pressure regulating means for regulating brake fluid pressures applied respectively to the wheel cylinders in dependence on a calculation result of the pressure increase amount calculation means so that the left and right wheels in the same system can be placed under a selection-low control while being placed under an anti-lock brake control.

With the construction in the second aspect of the present invention, the lock interval judgment means judges the difference in the relative length between lock-to-lock time intervals of the left and right wheels during braking of the vehicle, pressure increase amount calculation means calculates respective pressure increase amounts which are brake fluid pressures to the respective wheel cylinders for the left and right wheels in the pressure increasing mode, in dependence on the difference judged by the lock interval judgment means, and the fluid pressure regulating means controls the brake fluid pressures in the respective wheel cylinders based on the result of the calculation so that the selection-low control is performed on the left and right wheels in the same system during the anti-lock brake control. Thus, even where, because of the difference between the braking effects on the left and right wheels in the same system, the selection-low control is performed on the left and right wheels in the same system in braking the vehicle which is traveling on an even road surface, the brake fluid pressures supplied to the wheel cylinders for the left and right wheels are controlled to coincide with the pressure increase amounts which are calculated in dependence on the difference in the relative length between the lock-to-lock time intervals. Accordingly, the difference between the braking effects is compensated to balance the braking performances exercised by the left and right wheels, and thus, it can be realized to secure a sufficient vehicle braking performance as well as to enhance the stability of the vehicle.

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

DETAILED DESCRIPTION OF THE PREFERRED EMBODIMENT

Figure 1:
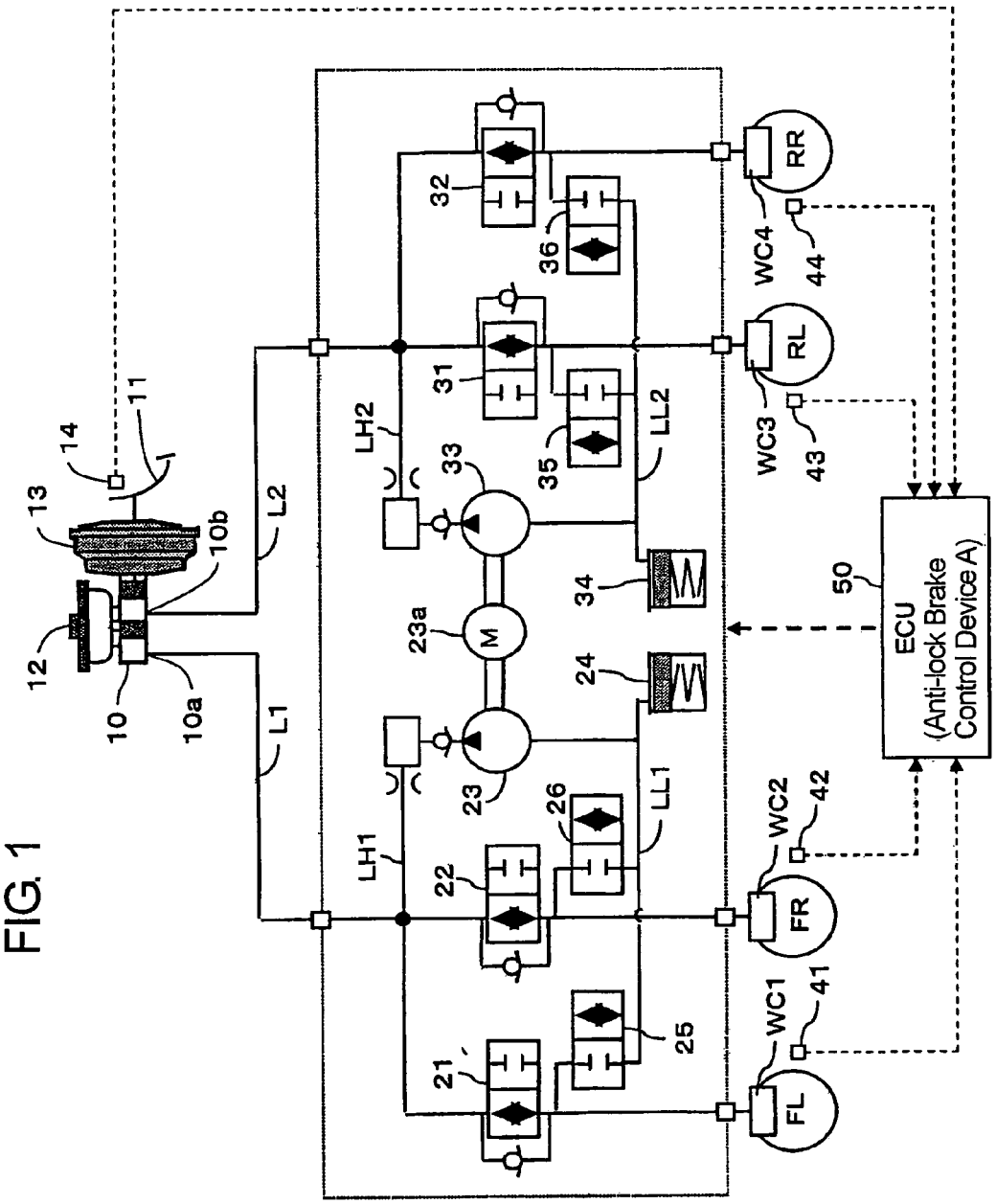
FIG. 1 is a schematic circuit diagram of a brake control device in one embodiment according to the present invention.

An anti-lock brake control device and a brake control device in one embodiment according to the present invention will be described hereinafter with reference to FIG. 1. FIG. 1 is a schematic view showing the general construction of the brake control device. The brake control device is of the type having an ABS (Anti-lock Brake System) function and is provided with a master cylinder 10 which generates brake oil of the fluid pressure corresponding to the stepping state of a brake pedal 11 to supply the brake oil to wheel cylinders WC1-WC4 for respectively restricting rotations of wheels FL, FR, RL and RR, a reservoir tank 12 storing the brake oil, and a vacuum booster 13 for assisting or boosting the stepping force on the brake pedal 11.

A first outlet port 10*a* of the master cylinder 10 communicates with a wheel cylinder WC1 for a front left wheel FL through a first oil line L1 and a solenoid valve 21 when the solenoid valve 21 is in a de-energized state (the illustrated state) and also communicates with a wheel cylinder WC2 for a front right wheel FR through the first oil line L1 and a solenoid valve 22 when the solenoid valve 22 is in a de-energized state (the illustrated state). The solenoid valves 21 and 22 are provided for making the first oil line L1 or a later-mentioned first high pressure oil line LH1 communicate with or blocked from the wheel cylinders WC1 and WC2 when energized or de-energized to change the states thereof.

The brake control device is provided with a pump 23. The pump 23 is driven by an electric motor 23*a*. A suction port of the pump 23 is in communication with a built-in reservoir tank 24 containing brake oil, and the pump 23 draws and pressurizes the brake oil to discharge the same from a discharge port. The discharge port of the pump 23 communicates with the master cylinder 10 through the first high pressure oil line LH1 and the first oil line L1 and also communicates with the wheel cylinders WC1 and WC2 through the first high pressure oil line LH1 and the solenoid valves 21 and 22 when the solenoid valves 21 and 22 as pressure increasing means are in the de-energized state (the illustrated state).

Branched from between the solenoid valves 21, 22 and the wheel cylinders WC1, WC2 is a first low pressure oil line LL1, which is connected to the built-in reservoir tank 24 through solenoid valves 25 and 26 serving as pressure reducing means. The solenoid valves 25 and 26 are provided for making the first low pressure oil line LL1 communicate with or blocked from the wheel cylinders WC1 and WC2 when energized or de-energized to change the states thereof.

A second outlet port 10*b* of the master cylinder 10 communicates with a wheel cylinder WC3 for a rear left wheel RL through a second oil line L2 and a solenoid valve 31 when the solenoid valves 31 is in a de-energized state (the illustrated state) and also communicates with a wheel cylinder WC4 for a rear right wheel RR through the second oil line L2 and a solenoid valve 32 when the solenoid valves 32 is in a de-energized state (the illustrated state). The solenoid valves 31 and 32 are provided for making the second oil line L2 or a later-mentioned second high pressure oil line LH2 communicate with or blocked from the wheel cylinders WC3 and WC4 when energized or de-energized to change the states thereof.

The brake control device is provided with another pump 33. The pump 33 is driven by the electric motor 23a. A suction port of the pump 23 is in communication with another built-in reservoir tank 34 containing brake oil, and the pump 34 draws and pressurizes the brake oil to discharge the same from a discharge port. The discharge port of the pump 33 communicates with the master cylinder 10 through the second high pressure oil line LH2 and the second oil line L2 and also communicates with the wheel cylinders WC3 and WC4 through the second high pressure oil line LH2 and the solenoid valves 31 and 32 when the solenoid valves 31 and 32 as pressure increasing means are in the de-energized state (the illustrated state).

Branched from between the solenoid valves 31, 32 and the wheel cylinders WC3, WC4 is a second low pressure oil line LL2, which is connected to the built-in reservoir tank 34 through the solenoid valves 35 and 36 serving as pressure reducing means. The solenoid valves 35 and 36 are provided for making the second low pressure oil line LL2 communicate with or blocked from the wheel cylinders WC3 and WC4 when energized or de-energized to change the states thereof. In this embodiment, the solenoid valves 21, 22, 31 and 32 also serve as fluid pressure regulating means.

Further, the brake control device is provided with a brake switch 14 which is provided close to the brake pedal 11 to be made ON when the brake pedal 11 is stepped on or to be made OFF when the brake pedal 11 is released. Further, the brake control device is provided with wheel speed sensors 41, 42, 43 and 44 which are respectively provided close to the wheels FL, FR, RL and RR for detecting the wheel speeds thereof.

Further, the brake control device is provided with an ECU (Electronic Control Unit or Anti-lock Brake Control Device A) 50 which has connected thereto the brake switch 14, the electric motor 23a, the solenoid valves 21, 22, 25, 26, 31, 32, 35 and 36 and the wheel speed sensors 41, 42, 43 and 44. The ECU 50 controls the brake fluid pressures applied to the wheel cylinders WC1-WC4, that is, the brake forces applied to the wheels FL, FR, RL and RR by controlling the open/close motions of the solenoid valves 21, 22, 25, 26, 31, 32, 35 and 36 of the brake control device in dependence on the wheel speed sensor values and the state of the brake switch 14.

Figure 2:
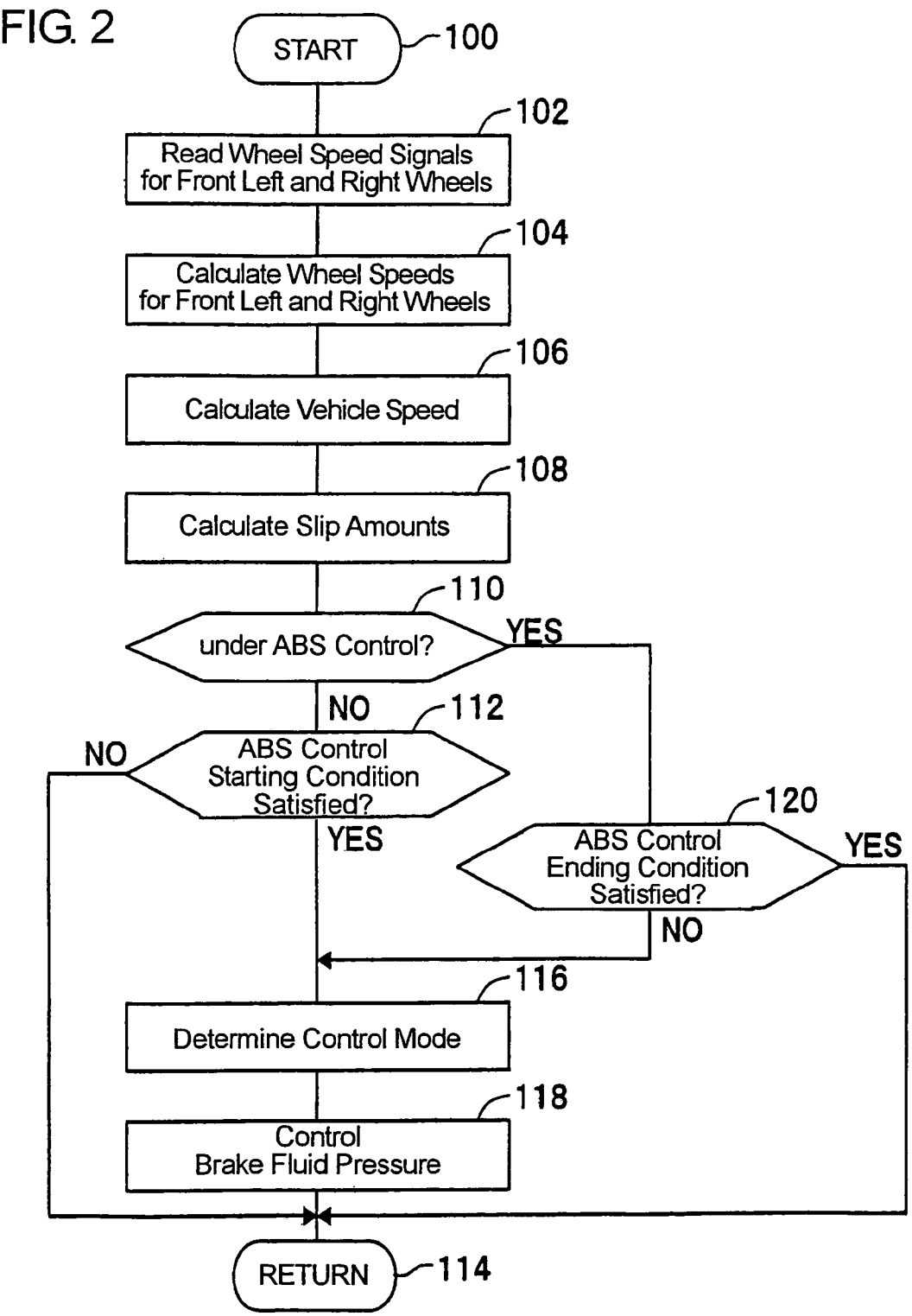
FIG. 2 is a flow chart of a control program executed by an ECU shown in FIG. 1.

Next, general operation of the brake control device as constructed above will be described in accordance with a flow chart shown in FIG. 2. The ECU 50 executes a program corresponding to the flow chart at a predetermined minute time interval when an ignition switch (not shown) of the vehicle is in ON state. The ECU 50 takes thereinto wheel speed signals of the front left and right wheels and the rear left and right wheels (step S102), calculates wheel speeds of the wheels by, e.g., obtaining the averages per unit time period from the wheel speed signals (step 104) and calculates a vehicle speed by, e.g., taking the maximum value of the wheel speeds of the wheels based on the calculated wheel speeds (step 106).

Then, the ECU 50 watches the lock state of each wheel based on the earlier calculated vehicle speed and wheel speeds and executes an ABS control when each wheel is in the lock state or does not executes the ABS control when each wheel is not in the lock state. Herein, the lock state encompasses not only a state wherein each wheel is locked, but also another state wherein a slip amount of each wheel is larger than a predetermined value (first threshold value noted as threshold value for pressure reduction in FIG. 6). The anti-lock brake system control is an operation for securing the friction force between each wheel and the road surface and the rotation of each wheel by automatically controlling the brake fluid pressure supplied to each wheel cylinder so that each wheel is not locked when braked.

The ECU 50 calculates the slip amount of each wheel based on the vehicle speed and the wheel speed thereof at step 108. For example, the slip amount is derived by subtracting the wheel speed from the vehicle speed. Then, whether the lock state or not is judged in dependence on the calculated slip amount, and the ABS control is initiated if an ABS control starting condition is satisfied. The ABS control starting condition is satisfied, e.g., when the slip amount of each wheel increases more than the predetermined value (first threshold value) with the vehicle speed being higher than a predetermined speed (e.g., 5 km/h).

That is, at step 110 after the processing at step 108, the ECU 50 judges whether or not the ABS control is being executed, and unless the ABS control is being executed, comes to step 112 to judge whether or not the ABS control starting condition has been satisfied. When the control starting condition has not been satisfied at step 112, the program proceeds to step 114 to terminate the program temporarily. If the control starting condition has been satisfied, the program is advanced to step 116 and the next thereto to start the ABS control.

The ECU 50 determines a control mode from a pressure reducing mode, a pressure retention mode and a pressure increasing mode at step 116 and executes a brake fluid pressure control corresponding to a selected control mode at step 118. The pressure reducing mode is continued until a predetermined time period expires from a time point when the slip amount exceeds the first threshold value, and in the mode, control is performed to reduce the brake fluid pressure supplied to the wheel cylinder. The pressure increasing mode is initiated at a time point when the wheel speed of each wheel which was in the pressure reducing mode is lowered to be less than the first threshold value to become almost the same speed as the vehicle speed and is continued until the wheel is placed in the pressure reducing mode. During the pressure increasing mode, control is performed to increase the brake fluid pressure supplied to the wheel cylinder. The pressure retention mode is a mode in which the brake fluid pressure is retained at a predetermined value (e.g., zero pressure) from the termination of the pressure reducing mode to the initiation of the pressure increasing mode.

The brake fluid pressure control in the pressure reducing mode, the pressure retention mode and the pressure increasing mode will be described hereunder with the front left wheel FL taken as example. In the pressure reducing mode, the ECU 50 closes the solenoid valves 21 and opens the solenoid valve 25 thereby to bring the wheel cylinder WC1 into blocking from the master cylinder 10 and communication with the built-in reservoir tank 24. Thus, a high pressure brake oil in the wheel cylinder WC1 is charged into the built-in reservoir tank 24, whereby the wheel cylinder WC1 is reduced in pressure. In this case, the solenoid valve 25 can be placed under PWM (Pulse Width Modulation) control, whereby it may be realized to control the flow volume of brake oil supplied from the wheel cylinder WC1 to the built-in reservoir tank 24. Also during the pressure reducing mode, the brake oil contained in the built-in reservoir tank 24 is discharged and returned to the master cylinder 10 through the operation of the pump 23 driven by the motor 23a.

In the pressure retention mode, the ECU 50 closes both of the solenoid valves 21 and 25 to block the wheel cylinder WC1 from the master cylinder 10 as well as from the built-in reservoir tank 24. Thus, the brake fluid pressure in the wheel cylinder WC1 is retained since this prevents the brake oil in the wheel cylinder WC1 from flowing into the master cylinder 10 and the built-in reservoir tank 24. The motor 23a remains stopped in the pressure retention mode.

In the pressure increasing mode, the ECU 50 opens the solenoid valve 21 and closes the solenoid valve 25 thereby to bring the wheel cylinder WC1 into communication with the master cylinder 10 and blocking from the built-in reservoir tank 24. Thus, the high pressure brake oil in the master cylinder 10 is pressured and charged to the wheel cylinder WC1 to increase the pressure in the wheel cylinder WC1. During this mode, the solenoid valve 21 is under PWM control, whereby it can be realized to control the flow volume of the brake oil supplied from the master cylinder 10 to the wheel cylinder WC1.

The ECU 50 controls any other wheel (front right wheel FR, rear left wheel RL or rear right wheel RR) in the same manner as aforementioned with the front left wheel FL. Further, the ECU 50 performs a selection-low control on left and right wheels which are in the same hydraulic system. Being the same in hydraulic system means that the wheel cylinders in the same hydraulic system are supplied with brake oil from the same supply source (supply port). More specifically, the front left and right wheels and the rear left and right wheels are respectively in the same systems as being provided with brake fluid respectively from the same supply ports, that is, respectively from the first outlet port 10a and the second outlet port 10b of the master cylinder 10. The selection-low control is a control operation for controlling the brake fluid pressures for the wheels in the same system to coincide with that for one wheel which is lower in wheel speed.

The aforementioned ABS control is executed until an ABS control ending condition is satisfied. That is, the ECU 50 repetitively executes the processing of the steps 100-110, 120, 116, 118 and 114 until "YES" is judged at step 110 and step 120. The control ending condition is satisfied, e.g., when the brake switch 14 is turned to OFF or when the slip amount exceeds a predetermined value. When the control ending condition is satisfied during the aforementioned repetitive processing (i.e., during the ABS control), "YES" is judged at step 120, whereby the program is advanced to step 114 to terminate the program temporarily.

The control operation in the pressure increasing mode of the anti-lock brake control device A which performs the ABS control as described above will be described hereinafter in accordance with flow charts shown in FIGS. 3 to 5. The processing described hereinafter is executed at step 118 in the pressure increasing mode. Each time starting the program at step 200, the ECU 50 judges whether or not the present time point is the time of pressure increasing edge, that is, whether or not the present time point is a starting point of the pressure increasing mode (step 202). More specifically, when the wheel speed of the wheel which was in the pressure reducing mode becomes almost the same speed as the vehicle speed, that is, when the wheel speed is in an increase tendency (i.e., when the differentiation value of the wheel speed is greater than zero) and when the difference between the vehicle speed and the wheel speed is equal to or less than a predetermined value, the present time point is judged to be a starting point of the pressure increasing mode, and when not so, it is judged not to be the starting point of the pressure increasing mode.

The ECU 50 calculates a cumulative compensation amount for use in calculating an pressure increase amount when the present time point is judged to be the pressure increase edge or uses a cumulative compensation amount at the time of the latest pressure increase edge as it is when the present time point is judged not to be the pressure increase edge. Then, the ECU 50 calculates the pressure increase amount based on either of these cumulative compensation amounts and controls the fluid pressure regulating means to attain the pressure increase amount. The pressure increase amount is a value corresponding to the brake fluid pressure supplied to the wheel cylinder in the pressure increasing mode and is expressed by the sum of a base pressure increase amount and a cumulative compensation amount. The friction coefficient ($\mu$) of the road surface is calculated by, e.g., being inferred from the variation amount in the vehicle speed, and the base pressure increase amount is set based on the calculated friction coefficient ($\mu$) of the road surface. The base pressure increase amount is set to be small when the road surface fiction coefficient ($\mu$) is low and to be large when the road surface fiction coefficient ($\mu$) is high. The cumulative compensation amount is a value which is used in increasing or decreasing the base pressure increase amount stepwise or gradually. For example, in the case that the pressure increase amount is controlled by performing the PWM control of the solenoid valve 21, the base pressure increase amount is set as a base duty ratio (e.g., 30% in the rate of energization time (closing time)), whereas the cumulative compensation amount is set as a unit of 5% in the duty ratio. Where the duty ratio defining the base pressure increase amount is decreased, there occur a shorter closing time and a longer opening time to increase the pressure increase amount. Where the duty ratio defining the base pressure increase amount is increased, there occur a longer closing time and a shorter opening time to decrease the pressure increase amount.

When judging at step 202 that the present time point is not the pressure increase edge time, the ECU 50 takes the cumulative compensation amount at the latest pressure increase edge time as the cumulative compensation amount (step 204), then sets a flag F to zero (step 206) and calculates the pressure increase amount for the right wheel based on the base pressure increase amount and the cumulative compensation amount at the latest pressure increase edge time (step 208). The flag F is provided for indicating whether or not the present time is a pressure increase edge time. The flag F indicates that the present time is the pressure increase time when set to "1" and indicates that it is not the pressure increase time when set to "0".

The ECU 50 calculates a pressure increase amount for the left wheel at step 210 and those subsequent thereto. However, not at the pressure increase edge time (i.e., flag F indicating "0"), the ECU 50 makes judgment of "NO" at step 210 to take the cumulative compensation value at the latest pressure increase edge time as the cumulative compensation value (step 212) and calculates a pressure increase amount for the left wheel based on the base pressure increase amount and the cumulative compensation amount at the latest pressure increase edge time (step 214). Then, after resetting the flag F to "0" (step 216), the ECU 50 advances the program to step 218 to terminate the program temporarily and controls the brake fluid pressure at step 118 in FIG. 2 so that the pressure increase amounts for the left and right wheels coincide with those calculated by the processing of the flow chart shown in FIG. 3.

On the other hands, when judging at step 202 that the present time is the pressure increase edge time, the ECU 50 advances the program to step 220 and those successive thereto to judge a difference in relative length between lock intervals of the left and right wheels during braking of the vehicle (steps 220 to 234 and 236), to calculate pressure increase amounts for respective wheel cylinders of the left and right wheels based on the difference in relative length between lock intervals which difference was determined by the judgment (steps 234 and 236), and to control the fluid pressure regulating means so that the pressure increase amounts come to coincide with those calculated during the pressure increasing mode.

Specifically, after setting the flag F to "1" at step 220, the ECU 50 measures the lock interval of the right wheel. At step 222, the ECU 50 judges whether or not the right wheel has fallen in the lock state prior to judgment for the pressure increase edge time. Where the right wheel has fallen in the lock state and where the lock interval is possible to measure, the lock interval of the right wheel is measured (steps 222 and 224). Where the right wheel has not fallen in the lock state even once or where the lock interval is unable to measure because occurrence of the lock state is once only, the right wheel is judged to be of absence of the lock interval (steps 222 and 226). The lock interval means a time interval between two consecutive time points at each of which each wheel falls in the lock state (i.e., lock-to-lock interval), and the absence of the lock interval means that the lock interval is endlessly long.

The ECU 50 also calculates the lock interval of the left wheel which is in the same system as the right wheel. At step 228, the ECU 50 judges whether or not the left wheel has fallen in the lock state prior to judgment for the pressure increase edge time. Where the left wheel has fallen in the lock state and where the lock interval is possible to measure, the lock interval of the left wheel is measured (steps 228 and 230). Where the left wheel has not fallen in the lock state even once or where the lock interval is unable to measure because occurrence of the lock state is once only, the left wheel is judged to be of absence of the lock interval (steps 228 and 232).

Figure 4:
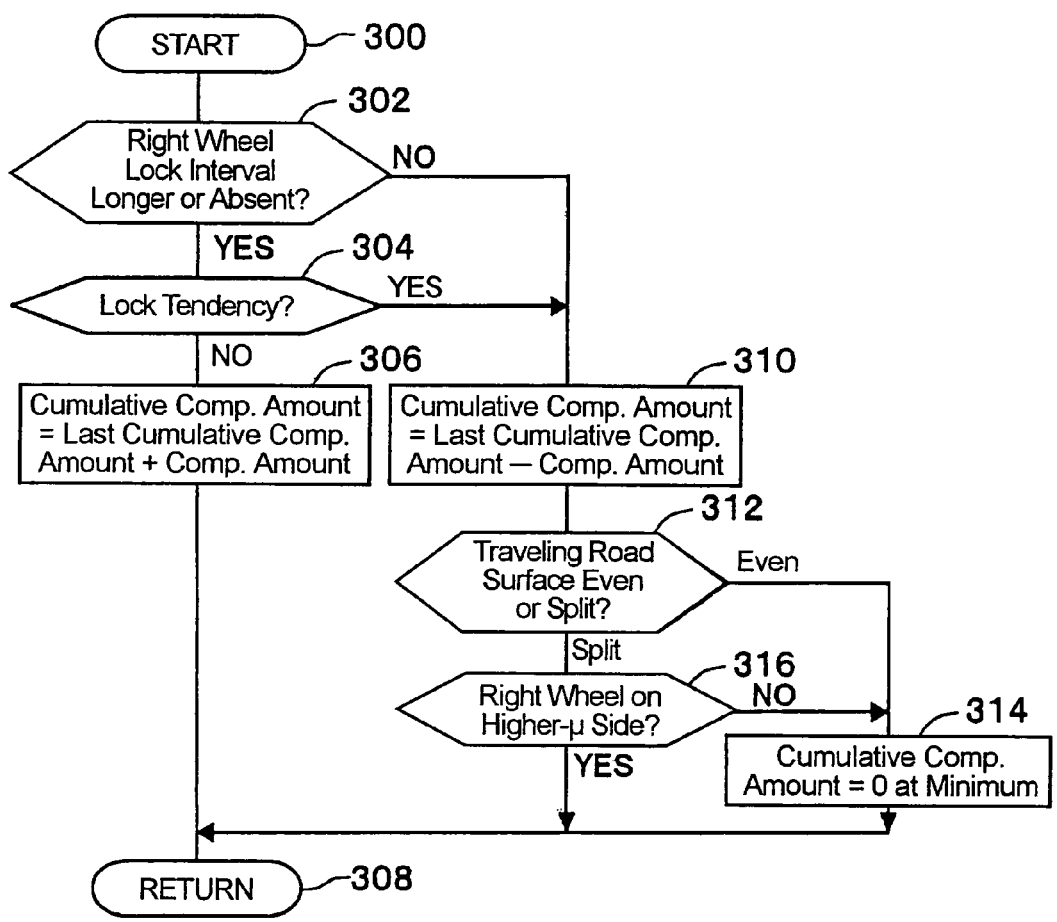
FIG. 4 is a flow chart of another control program executed by the ECU shown in FIG. 1.

Then, the ECU 50 calculates a cumulative compensation amount for the right wheel at step 234 by executing the program according to a flow chart shown in FIG. 4. Each time starting the program shown in FIG. 4 at step 300, the ECU 50 judges whether or not, the right wheel is a wheel whose lock interval is longer (step 302). This can be done by judging the relative length between the earlier measured lock intervals of the left and right wheels. If the right wheel has a longer lock interval, it is judged to be a wheel whose lock interval is longer, whereas if having a shorter lock interval, it is judged to be a wheel whose lock interval is shorter.

When judging that the right wheel is the wheel whose lock interval is longer, the ECU 50 at step 304 judges whether or not the right wheel longer in the lock interval tends to lock. More specifically, the right wheel is judged to have a lock tendency if the difference between the wheel speed of the right wheel and the vehicle speed is equal to or greater than a second threshold value which is smaller than the first threshold value for starting the pressure reducing mode, but is judged not to have the lock tendency if not. The ECU 50 calculates a cumulative compensation amount by increasing the last calculated cumulative compensation value by a compensation amount being a predetermined value until the right wheel is judged to have the lock tendency (steps 304 and 306). After the right wheel is judged to have the lock tendency, the ECU 50 calculates the cumulative compensation amount by subtracting the compensation amount being the predetermined value, from the last calculated cumulative compensation value (step 304 and 310).

After the processing at step 310, the ECU 50 judges whether the road surface on which the vehicle is traveling is an even road surface or a split road surface. Specifically, the ECU 50 calculates respective slip amounts of the left and right wheels when the system for controlling the left and right wheels independently is first brought into the pressure reducing mode while almost even brake fluid pressures are being supplied from the master cylinder 10 with the brake pedal 11 being stepped by the driver, and then compares the calculated slip amounts of the left and right wheels. The ECU 50 judges the road surface to be even if the calculated slip amounts are almost the same, but judges it as a split road surface if not. Then, when judging the road surface to be an even road surface, the ECU 50 sets the cumulative compensation amount calculated earlier at step 310 to zero (0) if the amount becomes less than zero (steps 312 and 314).

When judging the road surface to be a split road surface, the ECU 50 at step 316 judges whether or not the right wheel is on a higher-$\mu$ side (i.e., on a surface side higher in friction coefficient ($\mu$)). More specifically, the ECU 50 calculates respective slip amounts of the left and right wheels when the system for controlling the left and right wheels independently is first brought into the pressure reducing mode while almost even brake fluid pressures are being supplied from the master cylinder 10 with the brake pedal 11 being stepped by the driver, and then judges that of the wheels, one larger in slip amount is on a lower-$\mu$ side (i.e., on a surface side lower in friction coefficient ($\mu$)) and that the other wheel smaller in slip amount is on a higher-$\mu$ side. When judging that the right wheel is on the lower-$\mu$ side, the ECU 50 sets the cumulative compensation amount calculated earlier at step 310 to zero (0) if the amount becomes less than zero (steps 316 and 314). When judging that the right wheel is on the higher-$\mu$ side, the ECU 50 uses the cumulative compensation amount calculated earlier at step 310, at subsequent step 208 in FIG. 3 as it is (steps 316 and 308).

Further, when judging at step 302 that the right wheel is a wheel whose lock interval is shorter, the ECU 50 advances the program to step 310 to execute those processing at steps 310 through 316.

Figure 3:
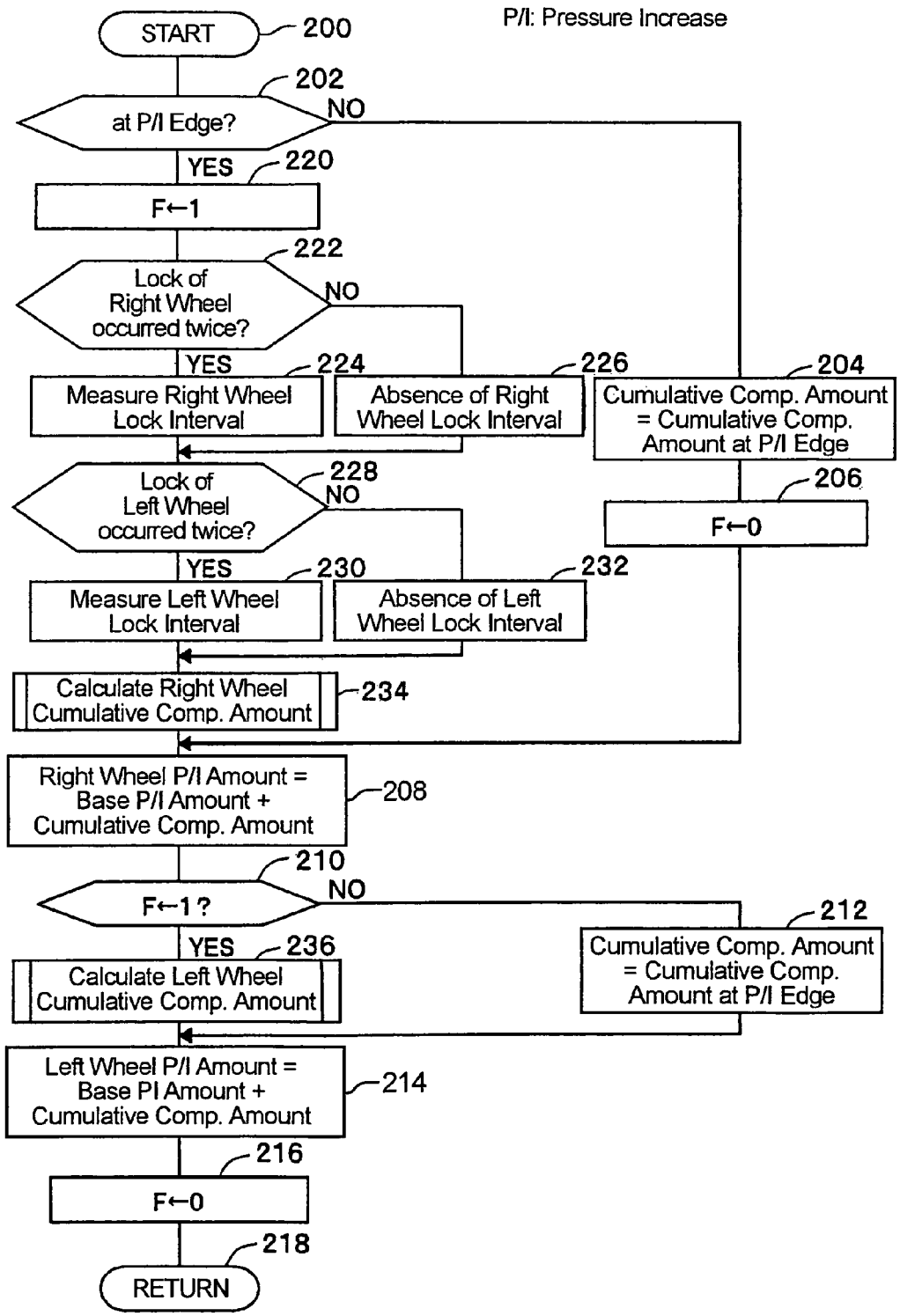
FIG. 3 is a flow chart of another control program executed by the ECU shown in FIG. 1.
Figure 5:
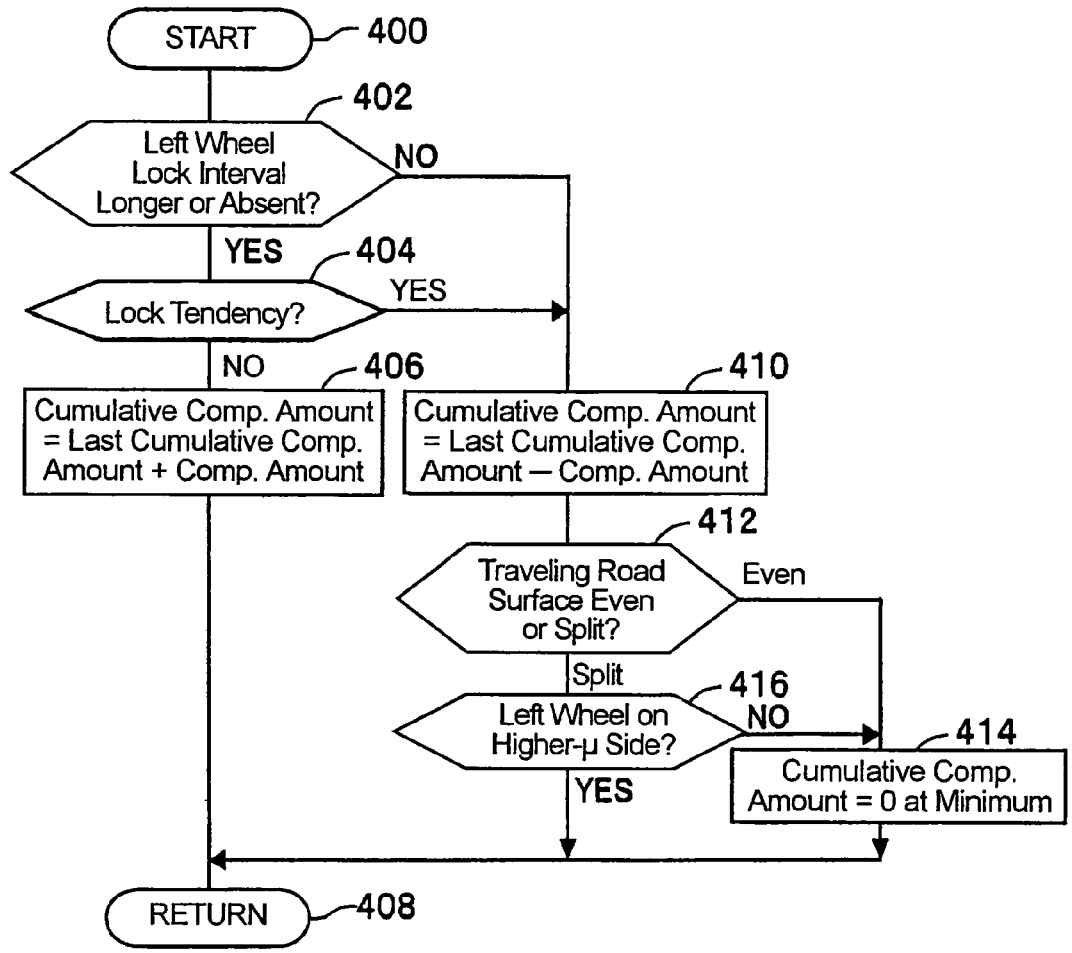
FIG. 5 is a flow chart of still another control program executed by the ECU shown in FIG. 1.

Further, at step 236 in FIG. 3, the ECU 50 executes a program according to a flow chart shown in FIG. 5 to calculate a cumulative compensation amount for the left wheel. Each time the ECU 50 starts the program at step 400, it judges whether or not the left wheel is a wheel whose lock interval is longer in the same manner as does at step 302 (step 402).

When judging that the left wheel is the wheel whose lock interval is longer, the ECU 50 at step 404 judges whether or not the left wheel longer in the lock interval has a lock tendency in the same manner as does at step 304. The ECU 50 calculates a cumulative compensation amount by increasing the last calculated cumulative compensation value by the compensation amount being the predetermined value until the left wheel is judged to have the lock tendency (steps 404 and 406). After the left wheel is judged to have the lock tendency, the ECU 50 calculates the cumulative compensation amount by subtracting the compensation amount being the predetermined value from the last calculated cumulative compensation value (step 404 and 410).

After the processing at step 410, the ECU 50 at step 412 judges whether the road surface on which the vehicle is traveling is an even road surface or a split road surface in the same manner as does at step 312. When judging the road surface to be an even road surface, the ECU 50 sets the cumulative compensation amount calculated earlier at step 410 to zero (0) if the amount becomes less than zero (steps 412 and 414). When judging the road surface to be a split road surface, the ECU 50 at step 416 judges whether or not the left wheel is on a higher-µ side in the same manner as does at step 316. When judging that the left wheel is on a lower-µ side, the ECU 50 sets the cumulative compensation amount calculated earlier at step 410 to zero (0) if the amount becomes less than zero (steps 416 and 414). When judging that the left wheel is on the higher-µ side, the ECU 50 uses the cumulative compensation amount calculated earlier at step 410, at subsequent step 214 in FIG. 3 as it is (steps 416 and 408).

Figure 6:
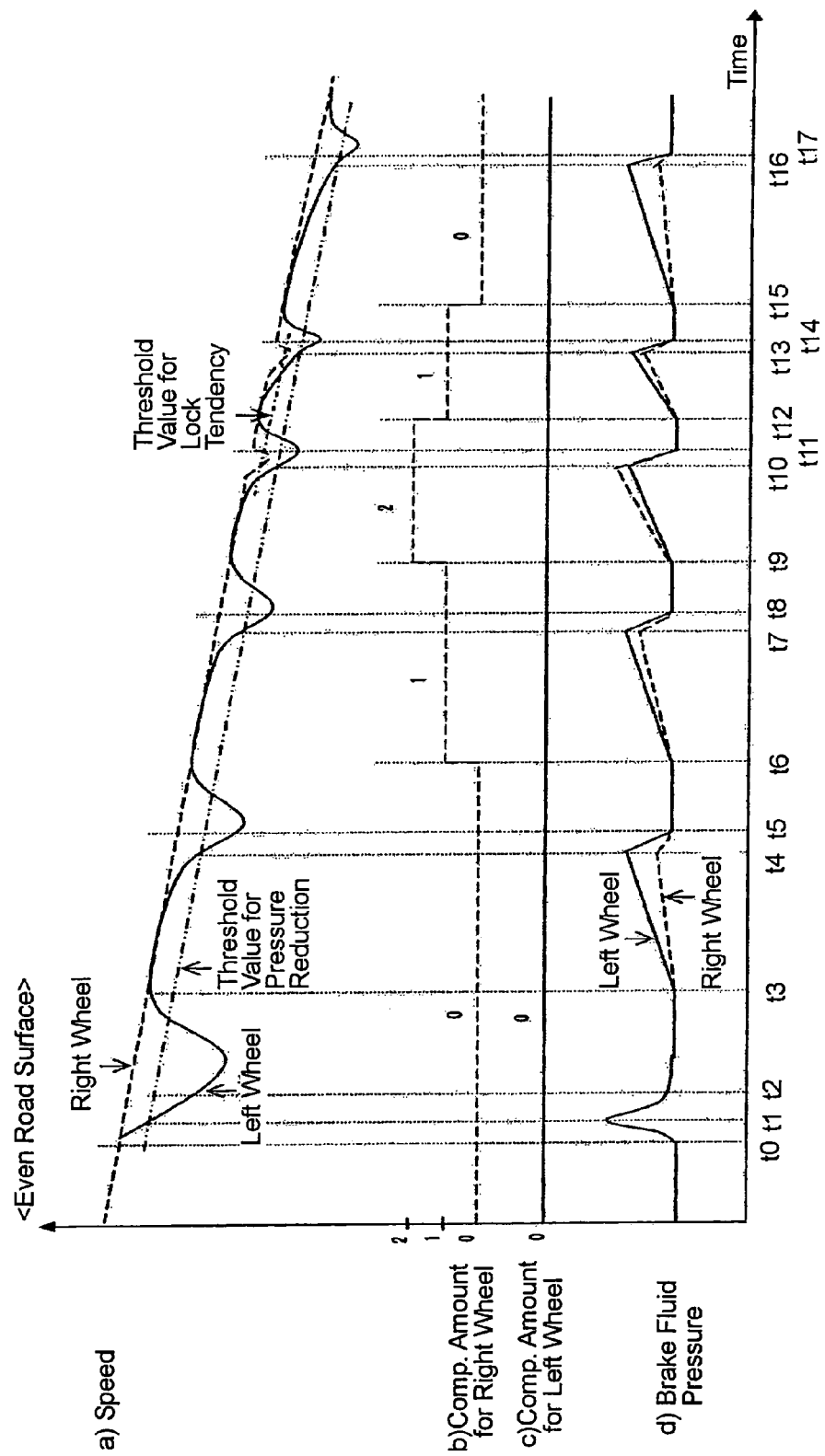
FIG. 6 is a time chart showing the control executed when the vehicle incorporating the brake control device according to the present invention is braked on an even road surface.

Next, the operation in the case that the vehicle incorporating the brake control device for performing control as described above, travels on an even road surface will be described with reference to a time chart shown in FIG. 6. Description here is directed to the front left and right wheels on the assumption that braking effect is normal on the front left wheel but is weak on the front right wheel. It is also assumed that that the front left and right wheels are placed under the selection-low control. When the brake pedal 11 is stepped by the driver at time point t0, the vehicle begins to be braked. Since the right wheel is weak in braking effect, the left wheel falls in the lock state. When it is judged at time point t1 that the left wheel is in the locked state, the control mode is turned into the pressure reducing mode wherein pressure reduction is performed on both of the left and right wheels until time point t2, and the pressure retention mode is continued from time point t2 to time point t3. During this period, the left wheel is not restricted against rotation, and the wheel speed of the same increases toward and finally to the same speed as the vehicle speed. When the pressure increasing mode is judged to have started at time point t3, the pressure increase amount is set to the base pressure increase amount because the pressure increasing mode is the first pressure increasing mode. Then, with an increase in brake force, the left wheel falls in the lock state, and hence, the pressure reducing mode is started at time point t4. While having a brake force applied thereto at this time, the right wheel is neither decreasing in wheel speed nor has the lock tendency to appear. In this way, the pressure reducing mode, the pressure retention mode and the pressure increasing mode are repetitively executed as one control cycle until the ABS control ending condition is satisfied.

In the second control cycle (i.e., from time point t4 to time point t7), the cumulative compensation amount for the left wheel is kept to be zero (0) since the left wheel is the wheel whose lock interval is shorter, and the cumulative compensation amount for the right wheel is increased by one to become one compensation amount since the right wheel is the wheel whose lock interval is longer. Thus, the brake fluid pressure for the left wheel remains to be the same as that in the first control cycle, whereas the brake fluid pressure for the right wheel is increased by one compensation amount than that in the first control cycle.

In the third control cycle (i.e., from time point t7 to time point t10), the cumulative compensation amount for the left wheel is kept to be zero (0) since the left wheel is the wheel whose lock interval is shorter, and the cumulative compensation amount for the right wheel is further increased by one to become two compensation amounts since the right wheel is the wheel whose lock interval is longer. Thus, the brake fluid pressure for the left wheel remains to be the same as that in the first control cycle, whereas the brake fluid pressure for the right wheel is increased by two compensation amounts than that in the first control cycle.

In the forth control cycle (i.e., from time point t10 to time point t13), the cumulative compensation amount for the left wheel is kept to be zero (0) since the left wheel is the wheel whose lock interval is shorter, and the cumulative compensation amount for the right wheel is decreased by one to become one compensation amount since the lock tendency is detected on the right wheel though the same is the wheel whose lock interval is longer. Thus, the brake fluid pressure for the left wheel remains to be the same as that in the first control cycle, whereas the brake fluid pressure for the right wheel is increased by one compensation amount than that in the first control cycle.

In the fifth control cycle (i.e., from time point t13 to time point t16), the cumulative compensation amount for the left wheel is kept to be zero (0) since the left wheel is the wheel whose lock interval is shorter, and the cumulative compensation amount for the right wheel is further decreased by one to become zero compensation amount since the lock tendency is still detected on the right wheel though the same is the wheel whose lock interval is longer. Thus, the brake fluid pressures for the left and right wheels become the same as those in the first control cycle.

As clearly understood from the aforementioned explanation, a difference between the braking effects on the left and right wheels is compensated by adjusting the pressure increase amount for the wheel whose lock interval is longer. In this case, the compensation is performed by increasing the brake fluid pressure for the wheel (right wheel in this instance) which is weaker in the braking effect thereon, wherein the pressure increase amount is increased gradually (second to third control cycles) until the lock tendency appears. After the lock tendency appears, the pressure increase amount is returned to that right before the lock tendency appears (fourth control cycle). When the lock tendency still appears after this return, the pressure increase amount is further decreased (fifth control cycle). As the lock tendency continues to appear, the decreasing pressure increase amount may become smaller than the base pressure increase amount. In that case, the cumulative compensation amount is controlled not to become less than zero (0) so that the brake force for the wheel which is weaker in the braking effect thereon can be kept at least equal to or greater than the base pressure increase amount (steps 312, 314 or steps 412, 414).

Figure 7:
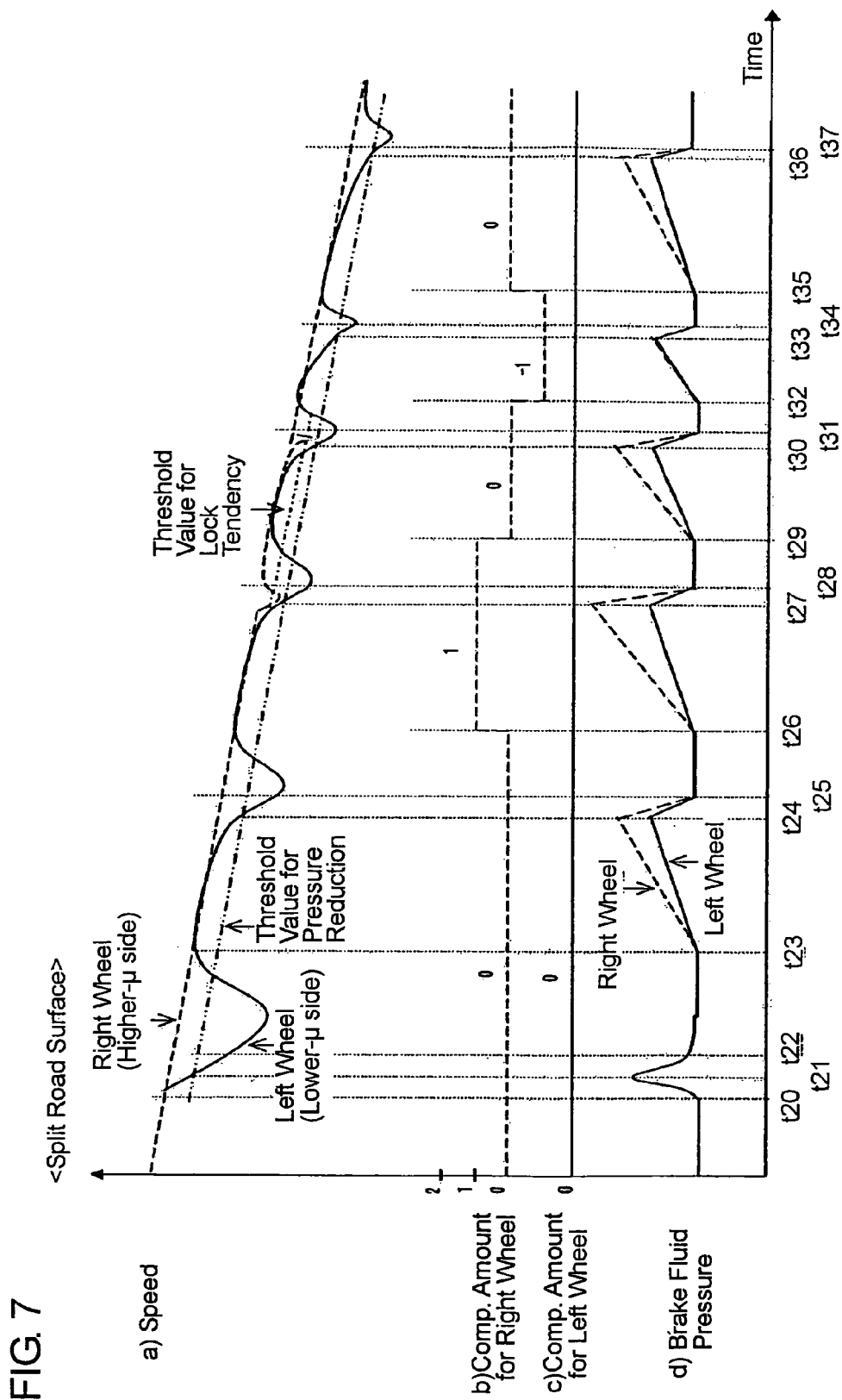
FIG. 7 is a time chart showing the control executed when the vehicle incorporating the brake control device according to the present invention is braked on a split road surface.

Further, the operation in the case that the vehicle incorporating the brake control device for performing control as described above travels on a split road surface will be described with reference to a time chart shown in FIG. 7. Also in this case, description here will be directed to the front left and right wheels on the assumption that braking effect is normal on the front left wheel but is strong on the front right wheel. It is also assumed that the front right wheel is on a higher-µ side whereas the front left wheel is on a lower-µ side. It is further assumed that the front left and right wheels are placed under the selection-low control. When the brake pedal 11 is stepped by the driver at time point t20, the vehicle begins to be braked. Since the left wheel is normal in the braking effect thereon and is on the lower-µ side, the left wheel falls in the lock state. When it is judged at time point t21 that the left wheel is in the lock state, the control mode is turned into the pressure reducing mode wherein pressure reduction is performed on both of the left and right wheels until time point t22, and the pressure retention mode is continued from time point t22 to time point t23. During this period, the left wheel is not restricted against rotation, and the wheel speed of the same increases toward and finally to the same speed as the vehicle speed. When the pressure increasing mode is judged to have started at time point t23, the pressure increase amount is set to the base pressure increase amount since the pressure increasing mode is the first pressure increasing mode. Then, with an increase in brake force, the left wheel falls in the lock state, and hence, the pressure reducing mode is started at time point t24. While having a brake force applied thereto at this time, the right wheel is neither decreasing in wheel speed nor has the lock tendency to appear. In this way, the pressure reducing mode, the pressure retention mode and the pressure increasing mode are repetitively executed as one control cycle until the ABS control ending condition is satisfied.

In the second control cycle (i.e., from time point t24 to time point t27), the cumulative compensation amount for the left wheel is kept to be zero (0) since the left wheel is the wheel whose lock interval is shorter, and the cumulative compensation amount for the right wheel is increased by one to become one compensation amount since the right wheel is the wheel whose lock interval is longer. Thus, the brake fluid pressure for the left wheel remains to be the same as that in the first control cycle, whereas the brake fluid pressure for the right wheel is increased by one compensation amount than that in the first control cycle.

In the third control cycle (i.e., from time point t27 to time point t30), the cumulative compensation amount for the left wheel is kept to be zero (0) since the left wheel is the wheel whose lock interval is shorter, and the cumulative compensation amount for the right wheel is decreased by one to become zero compensation amounts since the lock tendency is detected on the right wheel though the right wheel is the wheel whose lock interval is longer. Thus, the brake fluid pressures for the left and right wheels are controlled to be the same as those in the first control cycle.

In the forth control cycle (i.e., from time point t30 to time point t33), the cumulative compensation amount for the left wheel is kept to be zero (0) since the left wheel is the wheel whose lock interval is shorter, and the cumulative compensation amount for the right wheel is decreased by one to become minus one compensation amount since the lock tendency is still detected on the right wheel though the same is the wheel whose lock interval is longer. Thus, the brake fluid pressure for the left wheel remains to be the same as that in the first control cycle, whereas the brake fluid pressure for the right wheel is reduced by one compensation amount than that in the first control cycle.

In the fifth control cycle (i.e., from time point t33 to time point t36), the cumulative compensation amount for the left wheel is kept to be zero (0) since the left wheel is the wheel whose lock interval is shorter, and the cumulative compensation amount for the right wheel is increased by one to become zero compensation amount since the lock tendency is no longer detected on the right wheel which is the wheel whose lock interval is longer. Thus, the brake fluid pressures for the left and right wheels become the same as those in the first control cycle.

As clearly understood from the aforementioned explanation, a difference between the braking effects of the left and right wheels is compensated by adjusting the pressure increase amount for the wheel whose lock interval is longer. In this case, the compensation is performed by reducing the brake fluid pressure for the wheel (right wheel in this instance) which is stronger in the braking effect thereon, wherein the pressure increase amount is increased gradually (second control cycle) until the lock tendency appears. After the lock tendency appears, the pressure increase amount is returned to that right before the lock tendency appears (third control cycle). When the lock tendency still appears after this return, the pressure increase amount is further decreased (fourth control cycle). That is, the decrease of the pressure increase amount is continued until the lock tendency comes to end.

Figure 8:
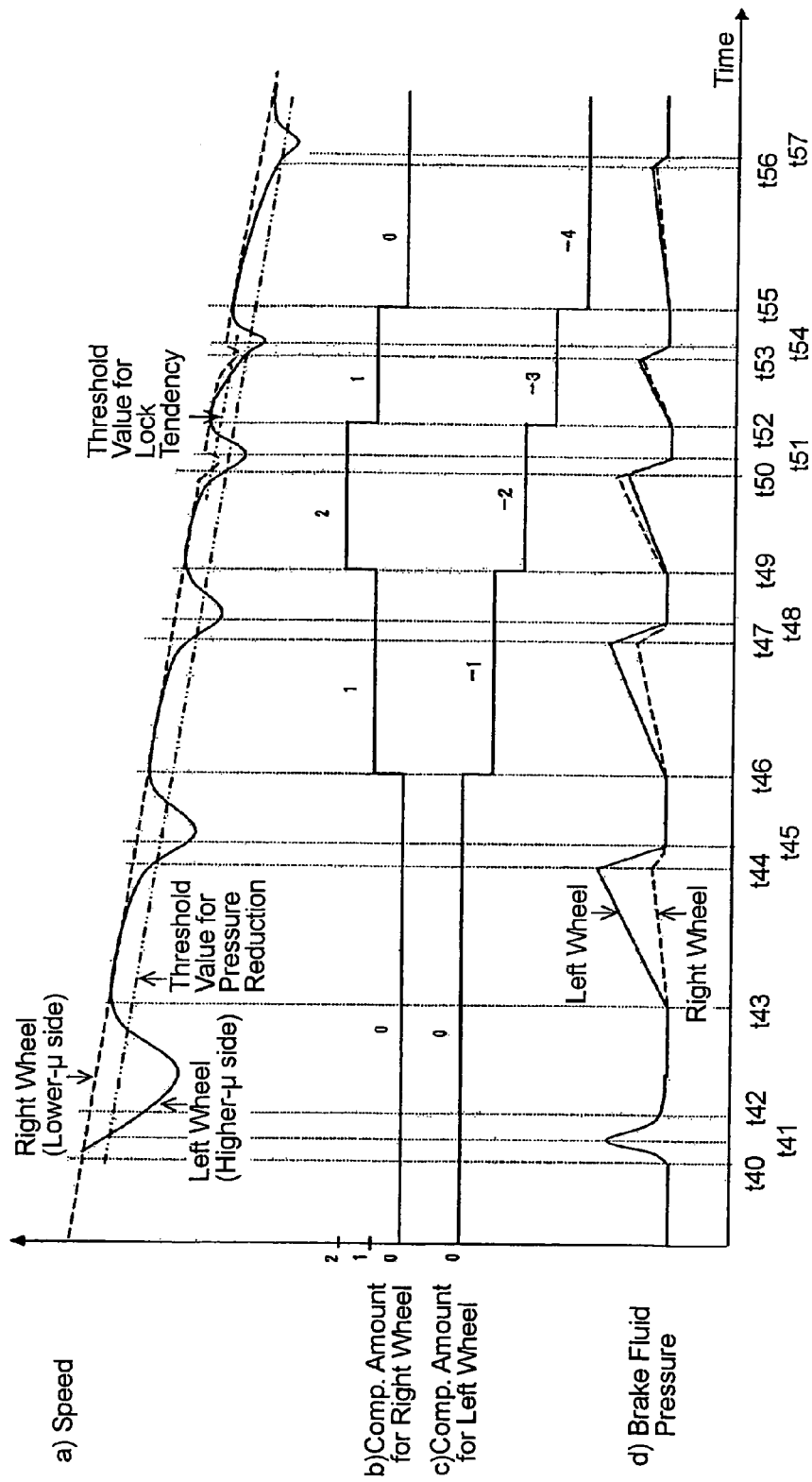
FIG. 8 is a time chart showing the control executed when the vehicle incorporating the brake control device according to the present invention is braked on another split road surface.

Furthermore, the operation in the case that the vehicle incorporating the brake control device for performing control as described above travels on another split road surface will be described with reference to a time chart shown in FIG. 8. Also in this case, description here will be directed to the front left and right wheels on the assumption that braking effect is stronger on the front left wheel but weaker on the front right wheel. It is also assumed that the front right wheel is on a lower-$\mu$ side whereas the front left wheel is on a higher-$\mu$ side. It is further assumed that the front left and right wheels are placed under the selection-low control. When the brake pedal 11 is stepped by the driver at time point t40, the vehicle begins to be braked. Since the left wheel is on the higher-$\mu$ side but is stronger in the braking effect thereon, it falls in the lock state thought the right wheel is on the lower-$\mu$ side. When it is judged at time point t41 that the left wheel is in the lock state, the control mode is turned into the pressure reducing mode wherein pressure reduction is performed on both of the left and right wheels until time point t42, and the pressure retention mode is continued from time point t42 to time point t43. During this period, the left wheel is not restricted against rotation, and the wheel speed of the same increases toward and finally to the same speed as the vehicle speed. When the pressure increasing mode is judged to have started at time point t43, the pressure increasing mode is the first pressure increasing mode, so that the pressure increase amount is set to the base pressure increase amount. Then, with an increase in braking force, the left wheel falls in the lock state, and hence, the pressure reducing mode is started at time point t44. While having a brake force applied thereto at this time, the right wheel is neither decreasing in wheel speed nor has the lock tendency to appear. In this way, the pressure reducing mode, the pressure retention mode and the pressure increasing mode are repetitively executed as one control cycle until the ABS control ending condition is satisfied.

In the second control cycle (i.e., from time point t44 to time point t47), since the left wheel is on a higher-$\mu$ side though it is the wheel whose lock interval is shorter, the cumulative compensation amount is decreased by one to become minus one compensation amount through those processing at step 402, 410, 412 and 416, and the cumulative compensation amount for the right wheel is increased by one to become one compensation amount. Thus, the brake fluid pressure for the left wheel is reduced by one compensation amount than that in the first control cycle, whereas the brake fluid pressure for the right wheel is increased by one compensation amount than that in the first control cycle.

In the third control cycle (i.e., from time point t47 to time point t50), the cumulative compensation amount for the left wheel is further decreased by one to become minus two compensation amounts through those processing at step 402, 410, 412 and 416 since the left wheel is on the higher-$\mu$ side thought it is the wheel whose lock interval is shorter, and the cumulative compensation amount for the right wheel is further increased by one to become two compensation amounts since the right wheel is the wheel whose lock interval is longer. Thus, the brake fluid pressure for the left wheel is reduced by two compensation amounts than that in the first control cycle, whereas the brake fluid pressure for the right wheel is increased by two compensation amounts than that in the first control cycle.

In the forth control cycle (i.e., from time point t50 to time point t53), the cumulative compensation amount for the left wheel is further decreased by one to become minus three compensation amounts through those processing at step 402, 410, 412 and 416 since the left wheel is on the higher-µ side though it is the wheel whose lock interval is shorter, and the cumulative compensation amount for the right wheel is decreased by one to become one compensation amount since the lock tendency is detected on the right wheel though the same is the wheel whose lock interval is longer. Thus, the brake fluid pressure for the left wheel is decreased by three compensation amounts than that in the first control cycle, whereas the brake fluid pressure for the right wheel is increased by one compensation amount than that in the first control cycle.

In the fifth control cycle (i.e., from time point t53 to time point t56), the cumulative compensation amount for the left wheel is further decreased by one to become minus four compensation amounts through steps 402, 410, 412 and 416 since the left wheel is on the higher-µ side thought it is the wheel whose lock interval is shorter, and the cumulative compensation amount for the right wheel is further decreased by one to become zero compensation amount since the lock tendency is still detected on the right wheel though the same is the wheel whose lock interval is longer. Thus, the brake fluid pressure for the left wheel is reduced by four compensation amounts than that in the first control cycle, whereas the brake fluid pressure for the right wheel becomes the same as that in the first control cycle.

As clearly understood from the aforementioned explanation, the difference between the braking effects on the left and right wheels is compensated by adjusting the pressure increase amounts for both of the wheels whose lock interval are respectively longer and shorter.

In the foregoing embodiment, lock interval judgment means (steps 222 to 232) judges the difference in relative length between the lock intervals of the left and right wheels during braking of the vehicle, pressure increase amount calculation means (steps 208, 214) calculates the pressure increase amounts which are the brake fluid pressures for the respective wheel cylinders in the pressure increasing mode, in dependence on the difference in relative length between the lock intervals judged by the lock interval judgment means, and the fluid pressure regulating means 21, 22, 31 and 32 is controlled in the pressure increasing mode so that the pressure increase amounts come to coincide with those calculated by the pressure increase amount calculation means. Thus, where the left and right wheels in the same system have a difference between the braking effects thereon, the brake fluid pressures applied to the left and right wheel cylinders are controlled to coincide with the pressure increase amounts which are calculated in dependence on the result of the lock interval length judgment even when the selection-low control is performed on the left and right wheels in the same system during braking of the vehicle traveling on an even road surface. Consequently, a sufficient vehicle braking performance can be secured by making compensation for the difference between the braking effects to balance the brake forces acting on the left and right wheels, so that it can be realized to improve the stability of the vehicle.

Also in the foregoing embodiment, the pressure increase amount is the sum of a base pressure increase amount and a cumulative compensation amount. Since the pressure increase amount is calculated on the basis of the base pressure increase amount, it can be realized to calculate the pressure increase amount accurately and reliably.

Also in the foregoing embodiment, lock tendency judgment means (steps 304, 404) judges whether or not the wheel whose lock interval is relatively longer is in the lock tendency, cumulative compensation amount calculation means (steps 306, 406) calculates a cumulative compensation amount by increasing the last calculated cumulative compensation amount by a predetermined amount until the occurrence of the lock tendency is judged by the lock tendency judgment means, and the pressure increase amount calculation means (steps 208, 214) calculates the pressure increase amount based on the cumulative compensation amount calculated by the cumulative compensation amount calculation means. Thus, the pressure increase amount is gradually increased until the wheel whose lock interval is relatively longer falls in the lock tendency, and therefore, the difference between the braking effects on the left and right wheels in the same system can be compensated easily and reliably, so that it can be realized to balance the brake forces acting on the left and right wheels.

Also in the foregoing embodiment, when the difference between the wheel speed and the vehicle speed becomes to be equal or greater than the second threshold value which is less than the first threshold value for use in judging the starting of the pressure reducing mode, the lock tendency judgment means (steps 304, 404) judges that the lock tendency has occurred. Thus, it can be realized to judge the occurrence of the lock tendency reliably prior to starting the pressure reducing mode.

Also in the foregoing embodiment, the pressure increase amount calculation means (steps 208, 214) is further provided with the cumulative compensation amount calculation means (steps 310, 410) for calculating the cumulative compensation amount by decreasing the predetermined amount from the last calculated cumulative compensation amount after the occurrence of the lock tendency is judged by the lock tendency judgment means (steps 304, 404). Thus, when the wheel whose lock interval is relatively longer is judged to be in the lock tendency as a result of the wheel cylinder therefor being increased in brake pressure, the pressure increase amount is discontinued to be further increased thereafter and instead, is decreased. Therefore, it can be realized to prevent each wheel cylinder from being more increased in pressure than as needed.

Also in the foregoing embodiment, the pressure increase amount calculation means (steps 208, 214) is further provided with road surface judgment means (steps 312, 412) for judging whether the road surface on which the vehicle is traveling is an even road surface or a split road surface. When the road surface is judged by the road surface judgment means to be an even road surface, the pressure increase amount calculation means sets to zero (0) the cumulative compensation amount calculated by the cumulative compensation amount calculation means (steps 310, 410) if the cumulative compensation amount becomes less than zero (0). Thus, where the vehicle traveling on the even road surface is braked with the selection-low control being performed on the left and right wheels in the same system, at least the base pressure increase amount can be retained as the pressure increase amount for the wheel weaker in the braking effect thereon even when the pressure increase amount therefor is decreased. Therefore, it can be realized to secure a minimum brake force for the wheel which is weaker in the braking effect thereon.

When the selection-low control is performed on the left and right wheels in the same system in braking the vehicle traveling on a split road surface and when the wheel stronger in the braking effect thereon is on a higher-µ side, the other wheel at the opposite side is placed under the anti-lock brake control, whereby the wheel stronger in the braking effect thereon exercises a more braking performance than as needed. At this point, the wheel on the higher-µ side becomes the wheel whose lock interval is relatively longer. Thus, once the execution of the aforementioned increase/reduction control of the pressure increase amount brings about the lock tendency, the subsequent decreasing of the pressure increase amount cannot diminish the same to be less than the base pressure increase amount. That is, the wheel on the higher-μ side remains to exercise a more braking performance than as needed. To cope with this, in the foregoing embodiment, the pressure increase amount calculation means (steps 208, 214) is further provided with road surface friction judgment means (steps 316, 416) for judging whether or not the wheel whose lock interval is relatively longer is on the higher-μ side where the road surface is judged by the road surface judgment means (steps 312, 412) to be the split road surface. The pressure increase amount calculation means sets to zero (0) the cumulative compensation amount, calculated by the cumulative compensation amount calculation means (steps 310, 410) if the cumulative compensation amount so calculated becomes less than zero (0) when the wheel is judged by the road surface friction judgment means not to be on the higher-μ side, but uses the cumulative compensation amount calculated by the cumulative compensation amount calculation means as it is. As a consequence, the braking effects on the left and right wheels are balanced by making the pressure increase amount for the wheel on the higher-μ side (i.e., right wheel in this instance) less than the base pressure increase amount, so that a sufficient vehicle braking performance can be secured without deteriorating the stability of the vehicle.

Furthermore, when the left and right wheels are placed under the selection-low control in braking the vehicle which is traveling on a split road surface wherein the wheel stronger in the braking effect thereon is on the higher-μ side whereas the other wheel weaker in the braking effect thereon is on the lower-μ side, the lock or the lock tendency may occur only on the wheel on the higher-μ side (namely, on the wheel stronger in the braking effect thereon). In this case, the wheel on the lower-μ side becomes the wheel whose lock interval is relatively longer, whereas the other wheel on the higher-μ side becomes the wheel whose lock interval is relatively shorter. At this point, it may be the case that the base pressure increase amounts for the both wheels are considerably different from each other, in which case a problem arises in that it takes a considerable time to compensate the pressure increase amounts for the both wheels by increasing the pressure of the wheel cylinder for the wheel which is smaller in the base pressure increase amount therefor (i.e., the wheel weaker in the braking effect thereon). To cope with this problem, in the foregoing embodiment, the pressure increase amount calculation means (steps 208, 214) is further provided with the cumulative compensation amount calculation means (steps 310, 410) for calculating a cumulative compensation amount by decreasing the predetermined amount from the last calculated cumulative compensation amount, the road surface judgment means (steps 312, 412) for judging whether the road surface on which the vehicle is traveling is an even road surface or a split road surface, and the road surface friction judgment means (steps 316, 416) for judging whether or not the wheel whose lock interval is relatively longer is on the higher-μ side where the road surface is judged by the road surface judgment means to be the split surface. When the road surface is judged by the road surface judgment means to be the even road surface, the pressure increase amount calculation means sets to zero (0) the cumulative compensation amount calculated by the cumulative compensation amount calculation means if the cumulative compensation amount becomes less than zero (0). On the other hand, when the road surface is judged by the road surface judgment means to be the split road surface and when the wheel whose lock interval is relatively longer is judged by the road surface friction judgment means not to be on the higher-μ side, the pressure increase amount calculation means sets to zero (0) the cumulative compensation amount calculated by the cumulative compensation amount calculation means if the cumulative compensation amount becomes less than zero (0). And, when the road surface is judged by the road surface judgment means to be the split road surface and when the wheel whose lock interval is relatively longer is judged by the road surface friction judgment means to be the higher-μ side, the pressure increase amount calculation means uses the cumulative compensation amount calculated by the cumulative compensation amount calculation means as it is. This makes it possible not only to increase the pressure increase amount for the wheel which is smaller in the base pressure increase amount (i.e., weaker in the braking effect thereon), but also to decrease the pressure increase amount for the wheel which is greater in the base pressure increase amount therefor (i.e., stronger in the braking effect thereon). As a consequence, it can be realized to compensate the pressure increase amounts for the both wheels in a short period of time even in the case that the base pressure increase amounts for the both wheels are considerably different from each other.

In the foregoing embodiment, the present invention is applied to a so-called "hydraulic brake control device" of the type having brake means for adjusting rotations of the wheels by regulating the brake fluid pressure supplied from the master cylinder 10 or the like by the use of the solenoid valves 21, 22, 31 and 32 constituting the fluid pressure regulating means and by supplying the regulated brake fluid pressure to the wheel cylinders WC1 to WC4. In a modified form, the present invention may be applied to another type of brake means for adjusting rotations of the wheels, namely to a so-called an electric type brake control device of the type wherein as described in, e.g., Japanese unexamined, published patent application No. 2002-104153, the brake force is electrically generated by the use of electric motors, instead of utilizing fluid pressure, to adjust rotations of the wheels.

Obviously, numerous modifications and variations of the present invention are possible in light of the above teachings. It is therefore to be understood that within the scope of the appended claims, the present invention may be practiced otherwise than as specifically described herein.

What is claimed is:

1. An anti-lock brake control device in a vehicle having wheel rotational speed sensor means for detecting respective rotational speeds of left and right wheels in the same system, and brake means for adjusting respective rotations of the left and right wheels, wherein during braking of the vehicle, the brake means is controlled to switch brake pressure in wheel cylinders in at least a pressure increasing mode and a pressure reducing mode in dependence on the rotational speeds of the wheels and wherein during braking of the vehicle, the left and right wheels in the same system are placed under a selection-low control, the anti-lock brake control device comprising:

lock interval judgment means for judging a difference in relative length between lock-to-lock time intervals of the left and right wheels during braking of the vehicle; and pressure increase amount calculation means for calculating respective pressure increase amounts for the left and right wheels in the pressure increasing mode during the selection-low control so that the wheel cylinders for the left and right wheels placed under the selection-low control are controlled in brake pressure independently of each other, in dependence on the difference judged by the lock interval judgment means;

wherein the anti-lock brake control device controls the brake means in the pressure increasing mode so that the pressure increase amounts coincide respectively with those calculated by the pressure increase amount calculation means, wherein each of the pressure increase amounts is the sum of a base pressure increase amount and a cumulative compensation amount, and wherein the pressure increase amount calculation means includes:

lock tendency judgment means for judging whether or not the wheel whose lock-to-lock time interval is relatively longer is in a lock tendency; and cumulative compensation amount calculation means for calculating the cumulative compensation amount in a pressure increasing mode next to the last pressure increasing mode by increasing the last calculated cumulative compensation amount by a predetermined amount until the wheel whose lock-to-lock time interval is relatively longer is judged by the lock tendency judgment means to be in the lock tendency; and wherein the pressure increase amount is calculated based on the cumulative compensation amount calculated by the cumulative compensation amount calculation means.

2. The anti-lock brake control device as set forth in claim 1, wherein the lock tendency judgment means judges each wheel to be in the lock tendency, when a difference between the speed of each wheel and the speed of the vehicle becomes equal to or greater than a second threshold value which is less than a first threshold value for use in judging whether the pressure reducing mode is to be started or not.

3. The anti-lock brake control device as set forth in claim 1, wherein the cumulative compensation amount calculation means calculates the cumulative compensation amount by decreasing the last calculated cumulative compensation amount by a predetermined amount after the occurrence of the lock tendency is judged by the lock tendency judgment means.

4. The anti-lock brake control device as set forth in claim 3, wherein:

the pressure increase amount calculation means further includes road surface judgment means for judging whether a road surface on which the vehicle is traveling is an even road surface or a split road surface; and when the road surface is judged by the road surface judgment means to be the even road surface, the pressure increase amount calculation means sets to zero the cumulative compensation amount calculated by the cumulative compensation amount calculation means if the calculated cumulative compensation amount becomes less than zero.

5. The anti-lock brake control device as set forth in claim 4, wherein:

the pressure increase amount calculation means further includes road surface friction judgment means for judging whether or not the wheel whose lock-to-lock time interval is relatively longer is on a higher-μ side where the road surface is judged by the road surface judgment means to be the split road surface; and the pressure increase amount calculation means sets to zero the cumulative compensation amount calculated by the cumulative compensation amount calculation means if the cumulative compensation amount becomes less than zero where the wheel whose lock-to-lock time interval is relatively longer is judged by the road surface friction judgment means not to be on the higher-μ side, but uses the cumulative compensation amount calculated by the cumulative compensation amount calculation means as it is where the wheel whose lock-to-lock time interval is relatively longer is judged by the road surface friction judgment means to be on the higher-μ side.

6. The anti-lock brake control device as set forth in claim 1, wherein the cumulative compensation amount calculation means calculates the cumulative compensation amount by decreasing the last calculated cumulative compensation amount by a predetermined amount for the wheel whose lock-to-lock time interval is relatively shorter;

wherein the pressure increase amount calculation means further includes:

road surface judgment means for judging whether a road surface on which the vehicle is traveling is an even road surface or a split road surface; and road surface friction judgment means for judging whether or not the wheel whose lock-to-lock time interval is relatively longer is on a higher-μ side where the road surface is judged by the road surface judgment means to be the split road surface; and wherein:

the pressure increase amount calculation means sets to zero the cumulative compensation amount calculated by the cumulative compensation amount calculation means if the cumulative compensation amount becomes less than zero where the road surface is judged by the road surface judgment means to be the even road surface;

the pressure increase amount calculation means sets to zero the cumulative compensation amount calculated by the cumulative compensation amount calculation means if the cumulative compensation amount becomes less than zero where the road surface is judged by the road surface judgment means to be the split road surface and where the wheel whose lock-to-lock time interval is relatively longer is judged by the road surface friction judgment means not to be on the higher-μ side; and the pressure increase amount calculation means uses the cumulative compensation amount calculated by the cumulative compensation amount calculation means as it is where the road surface is judged by the road surface judgment means to be the split road surface and where the wheel whose lock-to-lock time interval is relatively longer is judged by the road surface friction judgment means to be on the higher-μ side.

7. An anti-lock brake control device in a vehicle having wheel rotational speed sensor means for detecting respective rotational speeds of left and right wheels in the same system, and brake means for adjusting respective rotations of the left and right wheels, wherein during braking of the vehicle, the brake means is controlled in any of a pressure increasing mode, a pressure reducing mode and a pressure retention mode in dependence on the rotational speeds of the wheels and wherein during braking of the vehicle, the left and right wheels in the same system are placed under a selection-low control, the anti-lock brake control device comprising:

lock interval judgment means for judging a difference in relative length between lock-to-lock time intervals of the left and right wheels during braking of the vehicle; and pressure increase amount calculation means for calculating respective pressure increase amounts for the left and right wheels to be applied to the brake means, in dependence on the difference judged by the lock interval judgment means;

wherein the anti-lock brake control device controls the brake means during braking of the vehicle so that the pressure increase amounts coincide respectively with those calculated by the pressure increase amount calculation means;

wherein the pressure increase amount calculation means includes:

cumulative compensation amount calculation means for calculating a cumulative compensation amount by decreasing the last calculated cumulative compensation amount by a predetermined amount for the wheel whose lock-to-lock time interval is relatively shorter;

road surface judgment means for judging whether a road surface on which the vehicle is traveling is an even road surface or a split road surface; and road surface friction judgment means for judging whether or not the wheel whose lock-to-lock time interval is relatively longer is on a higher-$\mu$ side where the road surface is judged by the road surface judgment means to be the split road surface; and wherein:

the pressure increase amount calculation means sets to zero the cumulative compensation amount calculated by the cumulative compensation amount calculation means if the cumulative compensation amount becomes less than zero where the road surface is judged by the road surface judgment means to be the even road surface;

the pressure increase amount calculation means sets to zero the cumulative compensation amount calculated by the cumulative compensation amount calculation means if the cumulative compensation amount becomes less than zero where the road surface is judged by the road surface judgment means to be the split road surface and where the wheel whose lock-to-lock time interval is relatively longer is judged by the road surface friction judgment means not to be on the higher-$\mu$ side; and the pressure increase amount calculation means uses the cumulative compensation amount calculated by the cumulative compensation amount calculation means as it is where the road surface is judged by the road surface judgment means to be the split road surface and where the wheel whose lock-to-lock time interval is relatively longer is judged by the road surface friction judgment means to be on the higher-$\mu$ side.

* * * * *